United States Patent
Unuma et al.

(10) Patent No.: US 7,440,847 B2
(45) Date of Patent: Oct. 21, 2008

(54) NAVIGATION SYSTEM FOR MOVING OBJECT AND METHOD FOR PATH GUIDANCE FOR MOVING OBJECT

(75) Inventors: Munetoshi Unuma, Hitachinaka (JP); Kenichiro Kurata, Hitachinaka (JP); Hideki Inoue, Hitachi (JP); Yasunori Nagaoka, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/471,509

(22) Filed: Jun. 21, 2006

(65) Prior Publication Data
US 2007/0135994 A1 Jun. 14, 2007

(30) Foreign Application Priority Data
Jun. 22, 2005 (JP) ............................. 2005-181425

(51) Int. Cl.
*G01C 21/00* (2006.01)
*G01S 5/14* (2006.01)

(52) U.S. Cl. ................. 701/201; 701/210; 701/217; 342/357.14

(58) Field of Classification Search .......... 701/207, 701/201, 210, 217, 213; 342/357.14
See application file for complete search history.

(56) References Cited

U.S. PATENT DOCUMENTS

| | | | |
|---|---|---|---|
| 5,359,529 A | * | 10/1994 | Snider .................. 701/210 |
| 5,652,706 A | * | 7/1997 | Morimoto et al. ........... 701/210 |
| 5,982,301 A | * | 11/1999 | Ohta et al. ............... 340/995.2 |
| 6,023,653 A | * | 2/2000 | Ichimura et al. ............ 701/208 |
| 6,339,746 B1 | * | 1/2002 | Sugiyama et al. ........... 701/209 |
| 6,813,582 B2 | | 11/2004 | Levi et al. |
| 6,909,398 B2 | * | 6/2005 | Knockeart et al. ..... 342/357.14 |

\* cited by examiner

*Primary Examiner*—Mark Hellner
(74) *Attorney, Agent, or Firm*—Crowell & Moring LLP

(57) ABSTRACT

A navigation system for guiding a moving object from a current position to a destination includes a setting device that sets the current position and the destination, a sensor that detects movement of the moving object, a computing device that calculates move distance that the moving object has moved from the current position based on data outputted from the detecting sensor, and that determines a position of the moving object by shifting the calculated move distance from the current position on path data between the current position and the destination, which has been obtained by a path planning. The navigation system further includes a display device for displaying path guidance information depending on the determined position of the moving object.

7 Claims, 7 Drawing Sheets

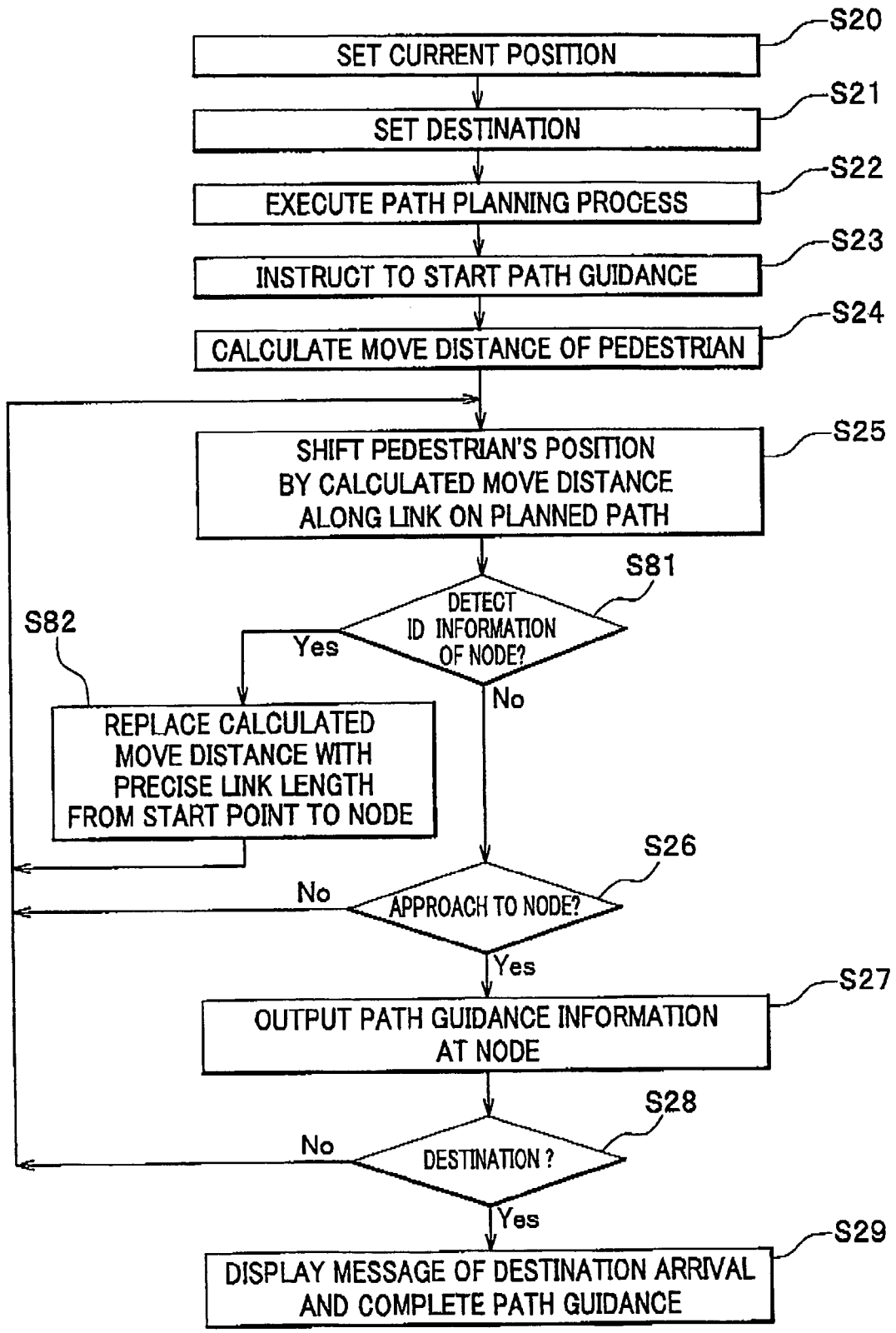

NAVIGATION SYSTEM FOR MOVING OBJECT AND METHOD FOR PATH GUIDANCE FOR MOVING OBJECT

CROSS-REFERENCE TO RELATED APPLICATION

This application claims the benefit of Japanese Patent Application No. 2005-181425 filed on Jun. 22, 2005, the disclosure of which is incorporated herein by reference.

FIELD OF THE INVENTION

This invention relates to a navigation system for a moving object and a method for path guidance for the moving object.

DESCRIPTION OF THE RELATED ART

Since satellite positioning technologies such as GPS (Global Positioning System) have been well-developed, our location can be detected wherever we are on the earth as far as we locate within area where radio waves from a positioning satellite reach. Recently, various car-navigation devices utilizing such a positioning satellite have been widely used. However, in-house or underground conditions which occupy quite large area among our whole life space often hinder radio waves from the positioning satellite. Consequently, it becomes very difficult to detect our current position in such conditions. In a prior art, for example, JP 2004-85511A discloses a technology to determine a person's move path by integrating his or her move distance and traveling orientation per time unit. In this prior art, move path is determined by integrating move distance and traveling orientation. As a detecting device for detecting traveling orientation, a geomagnetic sensor or a gyro sensor is commonly used. A geomagnetic sensor is likely to be subjected to errors due to magnetic field disturbance, and a gyro sensor experiences errors due to gyrodrift Therefore, integrating processes amplify these errors, resulting in causing more serious errors.

Taking the above problems into account, this invention provides a navigation system for a moving object and a method for path guidance for the moving object, in order to guide the moving object to the destination without detecting traveling orientation of the object.

SUMMARY OF THE INVENTION

One aspect of this invention provides a navigation system for guiding a moving object from a current position to a destination, which includes a setting device that sets the current position and the destination, a sensor that detects movement of the moving object, and a computing device that calculates move distance that the moving object has moved from the current position based on data outputted from the sensor, and that determines a position of the moving object by shifting the current position by the calculated move distance on path data between the current position and the destination, which has been obtained by a path planning. The navigation system further includes a display device for displaying path guidance information depending on the found position of the moving object.

Another aspect of this invention provides a method for path guidance for guiding a moving object from a current position to a destination, which includes steps of setting the current position and the destination, and calculating move distance that the moving object has moved from the current position, and of determining a position of the moving object by shifting the current position by the calculated move distance on path data between the current position and the destination, which has been obtained by a path planning. The method further includes a step of displaying path guidance information depending on the determined position of the moving object.

Other features and advantages of this invention will become more apparent from the following detailed description of the invention, when taken in conjunction with the accompanying exemplary drawings.

BRIEF DESCRIPTION OF THE DRAWINGS

FIG. 8 is a flow chart for explaining a method for path guidance according to the embodiment in FIG. 7.

DETAILED DESCRIPTION OF THE PREFERRED EMBODIMENTS

First Embodiment

Figure 1:
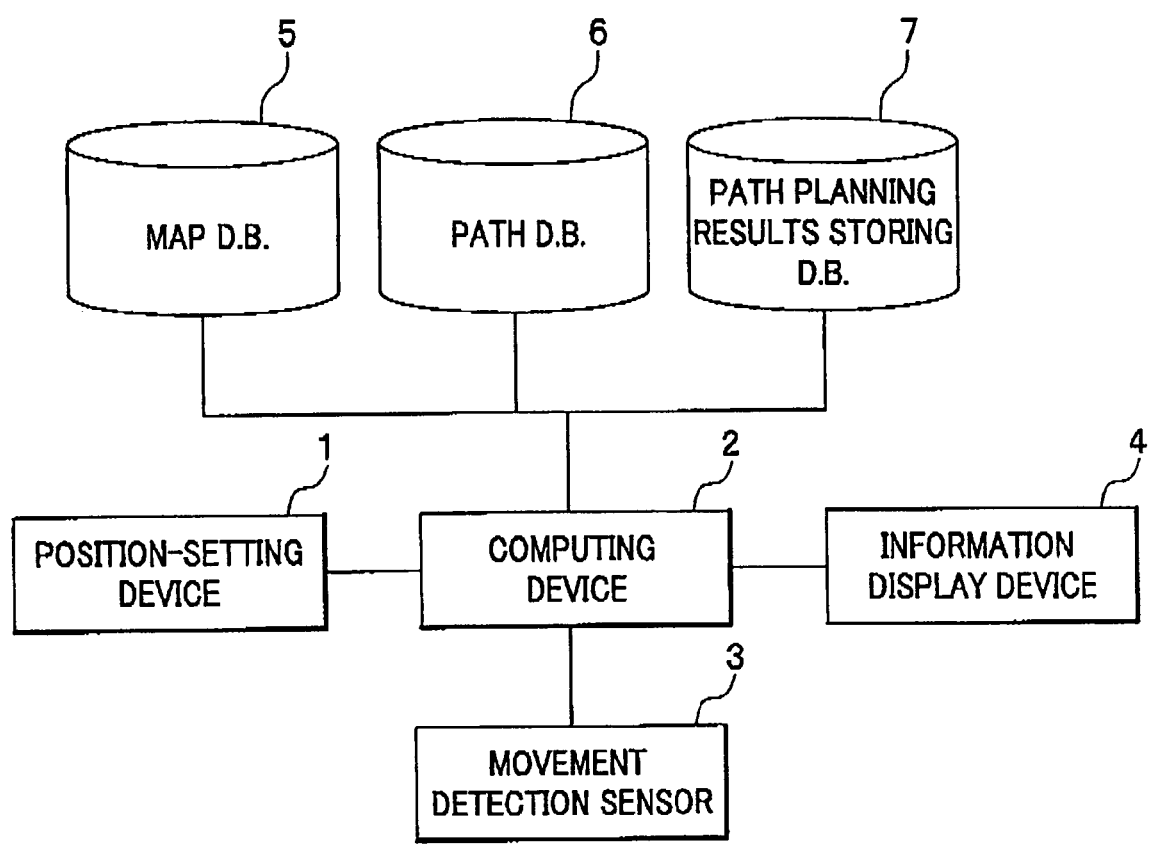
FIG. 1 is a functional block diagram of a navigation system for a moving object according to one embodiment of this invention.

FIG. 1 shows a functional block diagram of a navigation system for a moving object according to an embodiment of this invention. A position-setting device 1 sets, for example, a current position or a destination of a pedestrian which is a moving object. A movement detection sensor 3 detects movement of the moving object such as walking conditions of the pedestrian. An acceleration sensor or pedometer may be used for the movement detection sensor 3. A computing device 2 analyzes data outputted from the movement detection sensor 3 and calculates move distance of the pedestrian, or performs path planning process or map/speech generation process. For example, move distance is calculated in such a manner that strides of the pedestrian are estimated based on each walk movement resulted from waveform data of the acceleration sensor, and then data about the strides is accumulated, or the number of steps measured by a pedometer and pre-measured strides are used in combination. Various processors such as a micro computer may be used for the computing device 2. A map D.B. (database) 5 stores data for displaying maps. The map D.B. 5 stores data used for visualizing various maps for the user, specifically data used for various displays to show a map in vicinity of the current position, a path guidance map on the way to the destination, or a map used for setting a current position or destination of the user. A path D.B. 6 stores data used for path planning, which includes road fragments (links), road distances and link costs or the like, and data used for finding a shortest path from the start point to the destination. A path planning results storing D.B. 7 temporarily stores path planning results, and saves path information between the current position and the destination which has been requested in the path planning process. For such a database, a memory device such as a hard disk or a semiconductor memory may be used. An information display device 4 displays map information or path guidance information in picture or speech form (FIGS. 3-6). For such a display, a terminal display, various display devices or speakers may be used.

Figure 2:
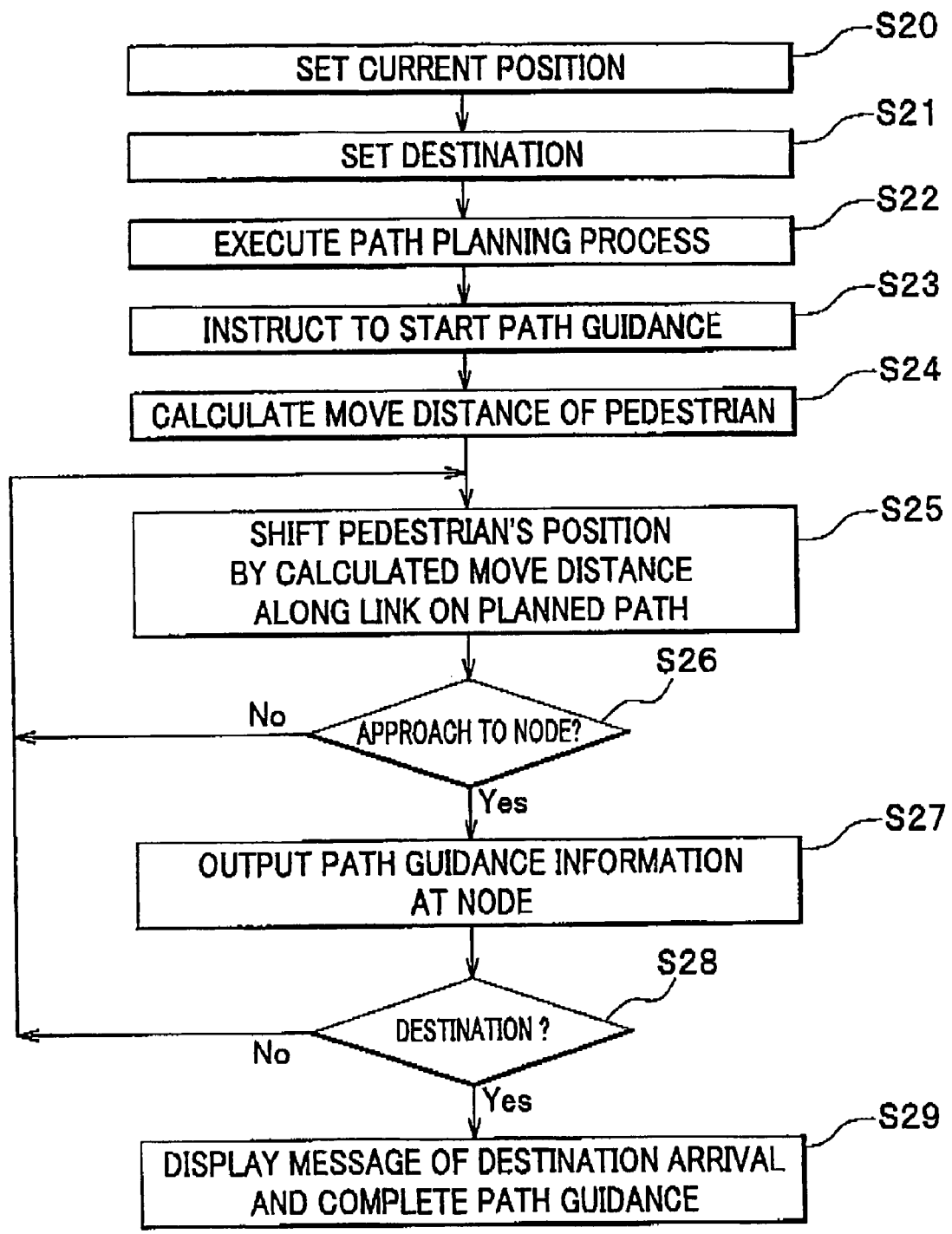
FIG. 2 is a flow chart for explaining a method for path guidance according to the embodiment in FIG. 1.
Figure 3:
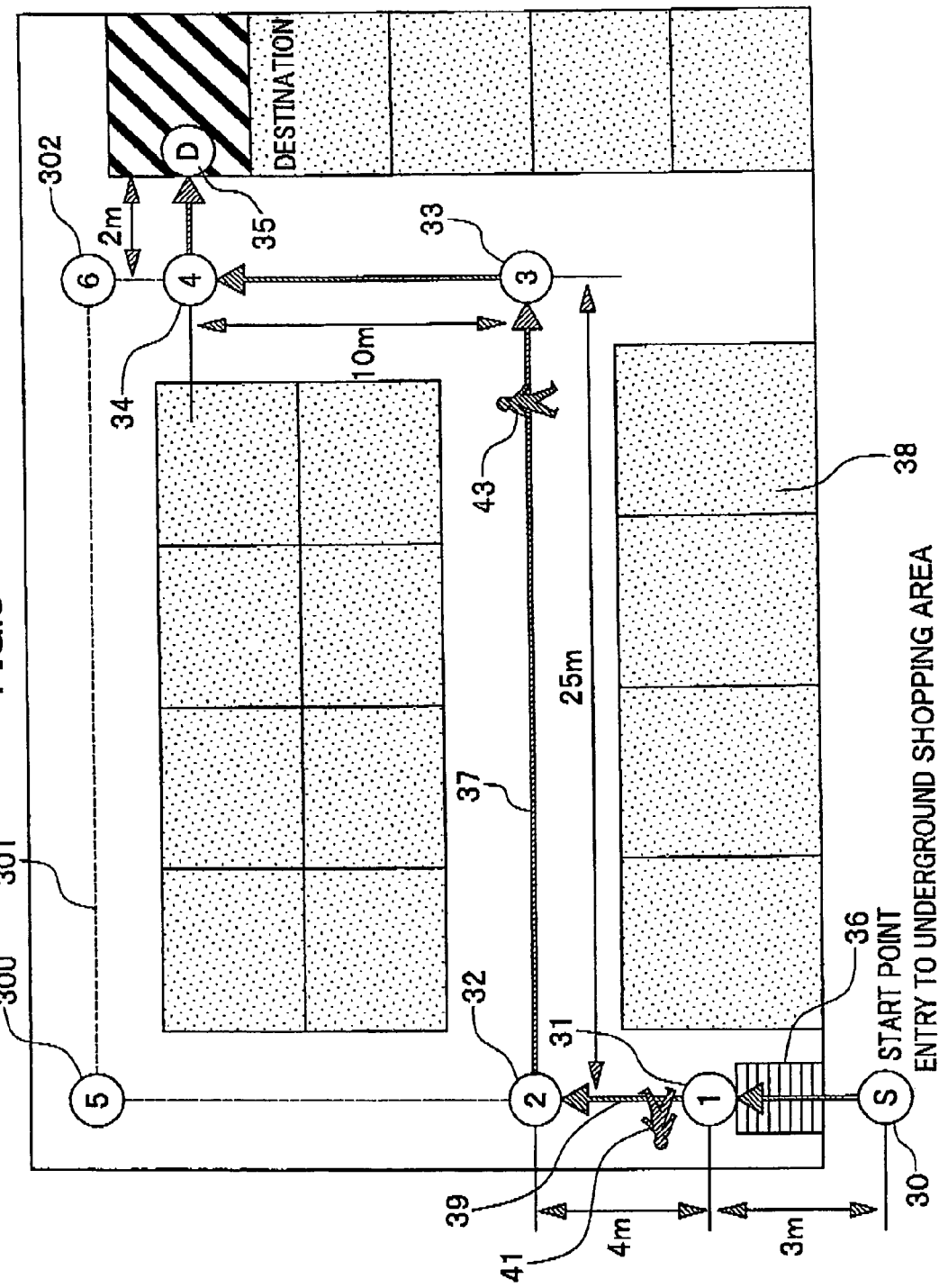
FIG. 3 shows an example in which the navigation system is applied in an underground shopping area.

FIG. 2 shows a flow chart for explaining a method for the path guidance provided by the navigation system according to the embodiment of this invention, as shown in FIG. 1. FIG. 3 shows an example of the navigation system that is employed in an underground shopping area. An explanation will be given on this method, assuming that the pedestrian does not deviate from the planned path, in reference with FIG. 2 and FIG. 3.

First, the current position (start point 30 in FIG. 3) is set (S20 in FIG. 2), and the destination (destination 35 in FIG. 3) is set (S21 in FIG. 2). The current position and the destination may be set in such a manner that map information including stairs 36, shops 38 or roads, etc. is generated by using data stored on the map D.B. 5 (FIG. 1) and is displayed on a terminal display. The user handles an appropriate key on the terminal to select an appropriate location on the map and then decide the location. Note that the destination 35 in FIG. 3 is one of the shops 38.

After completion of setting the current position and the destination, a path planning process is executed (S22 in FIG. 2). In the path planning process, data for the path planning stored on the path D.B. 6 (FIG. 1) is used so as to obtain path data from the current position to the destination by a Dijkstra method or the like. Data for the path planning includes information about road fragments (links) and nodes. Each link stores information about distance of road fragments and road conditions (stairs and slopes, etc.). The above information is used to estimate link cost when the path planning process is executed. Each node stores information about link connections other than the node locations (e.g. latitude/longitude). The information about the link connections is such that "a link (a), a link (b) and a link (c) are connected with a node (A)." Data on the link connections may be stored on nodes, or maybe stored on links. When the path planning process is executed, a minimum path data is generated based on a total link cost between the start point 30 (current position) and the destination 35. As shown in FIG. 3, for example, path data is generated in which a path starts from the start point 30 (S), down the stairs 30, through a node 1 (31), a node 2 (32), a node 3 (33), a node 4 (34) and reaches a node D that is the destination 35.

After the path data is generated, an instruction to start path guidance is executed (S23 in FIG. 2). In order to execute this instruction, a path guidance start button provided on the terminal is handled, or a speech instruction such as "Start the path guidance" is used as a path guidance start signal by using a speech recognition system. Once the instruction to start the path guidance is executed, move distance of the pedestrian is calculated first (S24 in FIG. 2). At S24, by using the movement detection sensor 3 (FIG. 1, e.g. acceleration sensor) provided on the terminal that the pedestrian carries, move distance per time unit l(n) is detected. Move distance L (t) from the start point to the current position may be found by the following formula (1). Note that "t" denotes the current time.

$$L(t) = \sum_{n=1}^{n=t} l(n) \qquad \text{Formula (1)}$$

Figure 4:
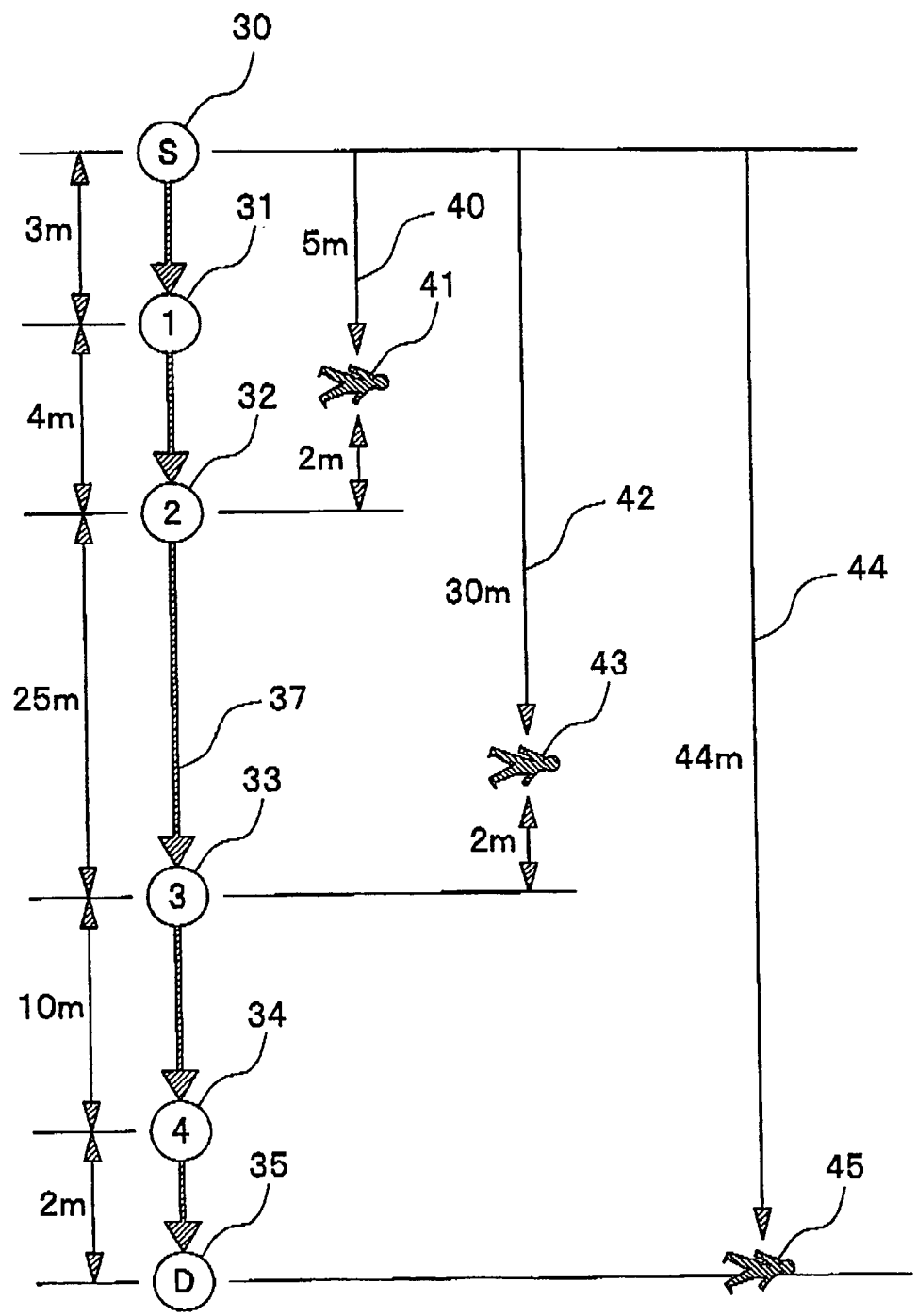
FIG. 4 is a display of path planning results in which nodes and links are arranged in line.

Next, the position of the pedestrian (a moving object) is shifted by the move distance calculated by the above formula (1) from the start point 30 as a base point, along a link on the path data which has been obtained by the path planning process (S25). FIG. 4 shows a block diagram where orientation information and node information (nodes 5, 6) unnecessary for the planned path are excluded from the path planning results in FIG. 3, and the nodes and the links are displayed in a linear arrangement. For example, a link 37 connects the node 2 and the node 3, and has length of 25m. At S26 (FIG. 2), it is determined whether or not that the pedestrian approaches to any one of the nodes. If he (or she) approaches to the node, path guidance information about the node is generated at S27 (FIG. 2), and is displayed (FIGS. 5, 6) on an information display device 4 (FIG. 1) such as the terminal display. For example, if the pedestrian approaches to the node 2 within 2m, and if it is determined in a computing process that a condition defined by the following formula (2) is satisfied, path guidance information is generated and provided for the pedestrian.

$$\left[ \{\text{Distance to Node 2}\} - \sum_{n=1}^{n=t} l(n) \right] \leq 2 \qquad \text{Formula (2)}$$

Figure 5:
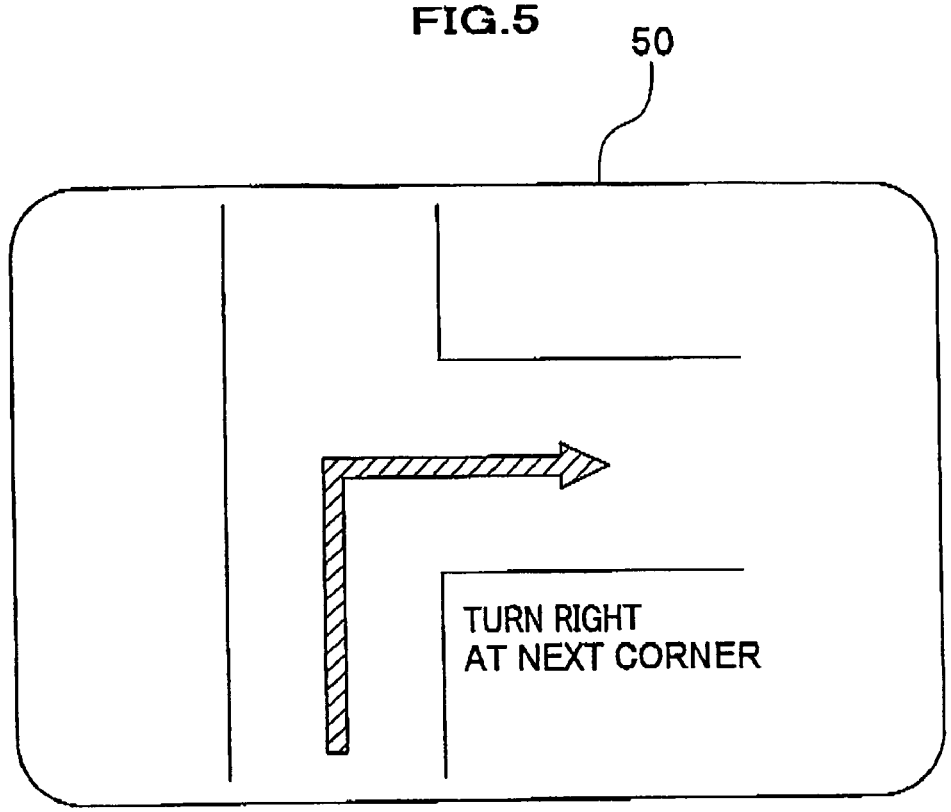
FIG. 5 is an image display of path guidance to turn right.

An explanation will be given on how to provide the path guidance information, assuming that the pedestrian locates at the position 41. Information to be provided includes information about orientation/distance from a node that the pedestrian has reached a next node and a path (link) leading to the next node. In this case, the pedestrian is at the position 41, therefore, the next node will be the node 2. Proceeding orientation further from the node 2 can be found by considering a link 39 proceeding from the node 1 to the node 2, and a link 37 proceeding from the node 2 to the node 3. At this time, the proceeding orientation to be found is 90° to the right. The distance of the link 37 can be found by using location information (latitude/longitude) of the node 2 and the node 3. Although there are indicated no latitude/longitude on each node in FIG. 8, it is assumed that the distance of the link 37 is 25 m, in this case. The path (link) data including road surface conditions is stored on each node, and the data is used for reference if necessary. For example, the link 37 is stored as an ordinary path, and data on a previous link to the link 37 is stored as information about the stairs 36, and the data is used for reference if necessary. Based on the above information, appropriate path guidance information is generated and output in image display format or in speech guidance format. At the position 41 in FIG. 3, the path data shows that the path will turn right at the node 2. Therefore, guidance information may be provided in such a manner that an image display 50 showing to "turn right" is displayed, as shown in FIG. 5, or that a speech announcement such as "2 m ahead turn right and then 25 m go straight" is outputted.

Figure 6:
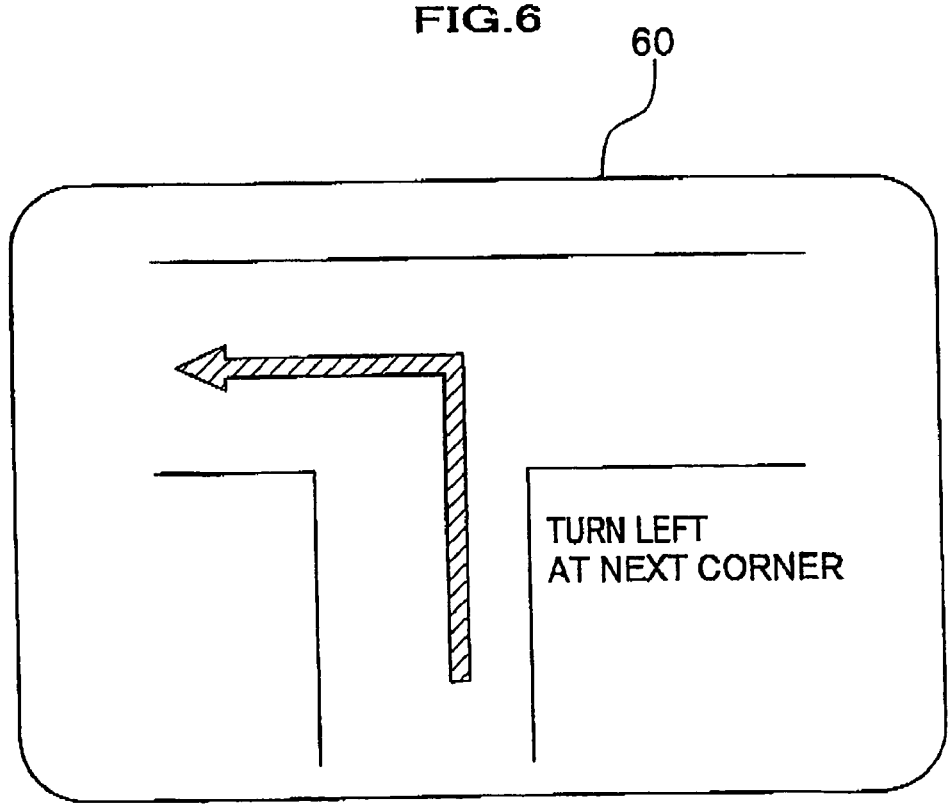
FIG. 6 is an image display of path guidance to turn left.

When the pedestrian turns right according to the image display 50, and his move distance from the start point found by the formula (1) reaches 30 m, a display is appeared showing that the pedestrian's current position is at the position 43 between the node 2 and the node 3 (FIG. 3 and FIG. 4). Specifically, although the pedestrian actually turned right at the node 2, the path information in FIG. 4 from which orientation information has been removed are associated with the move distance from the start point found by the formula (1), and the position of the pedestrian is shifted by the above move distance on the path data, yielding the current position of the pedestrian on the planned path. If the pedestrian's position on the link 37 which has been associated with FIG. 4 is then associated with FIG. 3, the pedestrian's position can be grasped in two dimensions as indicating the pedestrian's position 43 in FIG. 3 The position 43 is a position 2 m before the node 3, and at this position 43, a display in FIG. 6 is displayed to guide the pedestrian to the left.

By comparing distance on the path data between the current position and the predetermined position found by the formula (2) with the move distance calculated by the formula (1), it is possible to display various guidance information. For example, the predetermined position includes a node at which the proceeding orientation changes as described above, and the predetermined position may include an uppermost or lowermost position of the stairs at which path conditions (link attributes) change as well In this case, a start or end of the stairs may be displayed.

Next, if a total move distance of the pedestrian reaches a summed distance of all links (44 m in FIG. 3 and FIG. 4), it is determined that the pedestrian has reached the destination (S28 in FIG. 2). A message is provided that the pedestrian has been reached the destination via an image display on the terminal or speech guidance, and then the path guidance is completed (S29 in FIG. 2).

According to the first embodiment, the path guidance information is provided every time the pedestrian approaches to a node. However, a current position may also be displayed in a two-dimension map, even when the pedestrian locates in an intermediate section of a link such as at the position 41 or at the position 43 in FIG. 3, showing move-state information how the pedestrian is moving. As shown in FIG. 4, excluding the orientation information, a linear relationship of the nodes and the links may also be displayed in a one-dimension path map, on which the pedestrian's current location is displayed, such as the position 41 or the position 43.

The navigation system according to the first embodiment provides path guidance without using orientation information. Accordingly, influences caused by errors of orientation detection due to magnetic field disturbance or gyrodrift can be prevented.

Second Embodiment

Figure 7:
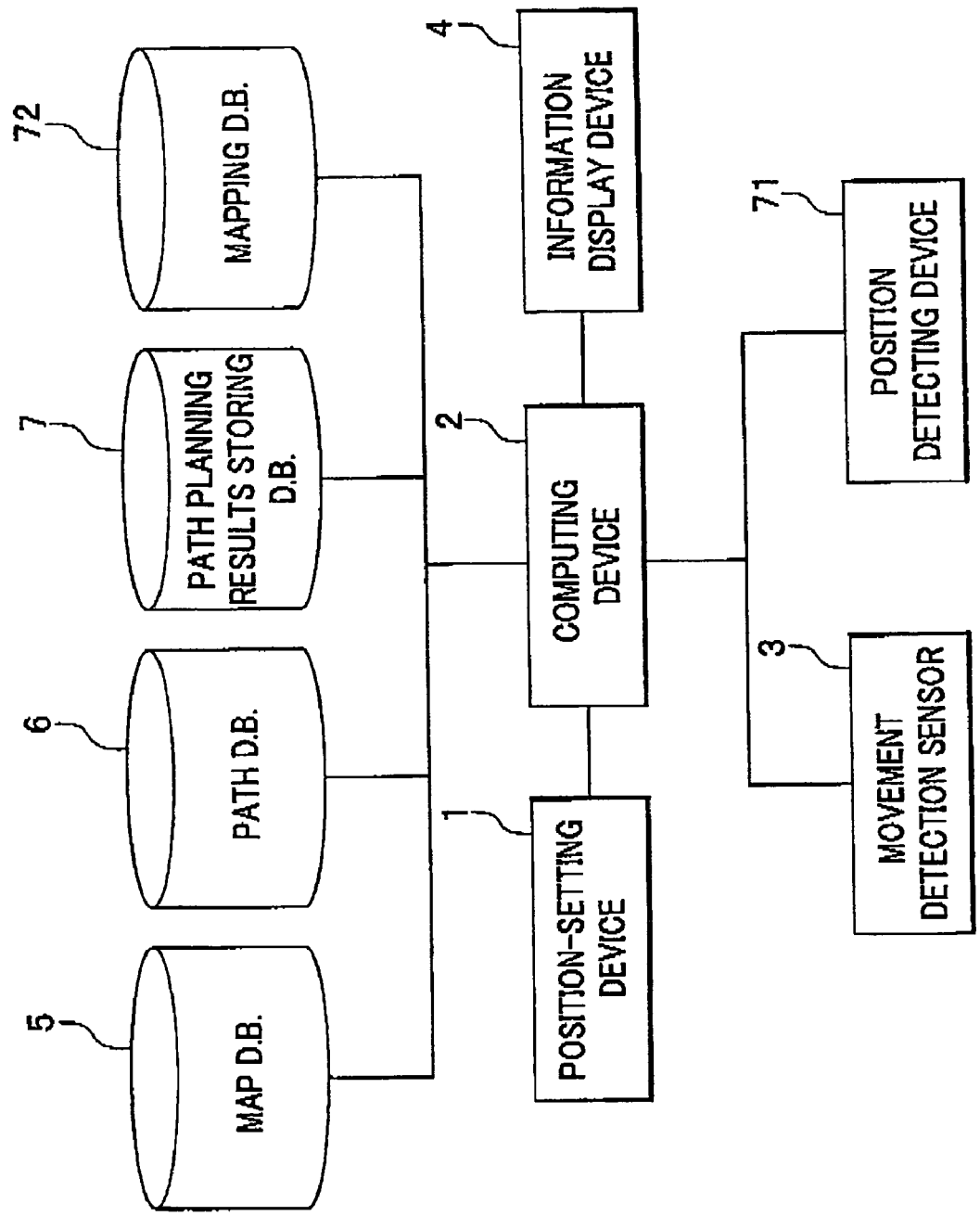
FIG. 7 is a functional block diagram of a navigation system for a moving object according to second embodiment of this invention.

FIG. 7 shows a functional block diagram of a navigation system according to another embodiment of this invention.

The navigation system of the second embodiment includes a position detecting device 71 and a mapping D.B. (database) 72 having mapping between positions detected by the position detecting device 71 and a corresponding node. On this point, the navigation system according to the second embodiment is different from that of the first embodiment. According to the second embodiment, by using the mapping D.B. 72 and the position detecting device 71 for detecting that a pedestrian that is a moving object reaches a predetermined position such as a node on a path data, an error correction can be provided on errors which are caused by executing the integrating process according to the formula (1) every time each move distance is determined between a start point and a destination. A position detecting device using RFID (Radio Frequency Identification) such as IC tags, radio beacons, wireless LAN or GPS may be used as the position detecting device 71. According to the second embodiment, for example, the position detecting 71 may be an apparatus for detecting the predetermined position, using RFID incorporated in a braille block on a real path. The position detecting device 71 using RFID detects the pedestrian's position by using a table to map position information and ID information that is transmitted from RFID. A braille block in which RFID is incorporated is provided on a real path at a position corresponding to a node on the path data, as shown in FIG. 3. The mapping table, stored on the mapping D.B. 72, maps ID information of each RFID incorporated in a braille block at a position corresponding to a node with position information of the corresponding node. Accordingly, when ID information of RFID incorporated in the real path is read into a terminal that the pedestrian carries, the mapping table stored on the mapping D.B. 72. is referred so as to provide position information indicating at which node the pedestrian currently locates.

FIG. 8 is a flow chart explaining a method for path guidance according to the second embodiment in FIG. 7. Steps 20 to 25 are the same as those in the flow chart in FIG. 2, where move distance of the pedestrian is calculated (S24), and the position of the current pedestrian is shifted by the calculated move distance, along a link on the planned path (S25). If the above move distance reaches the node 2 in FIG. 3, ID information of the node 2 is detected, which is transmitted from RFID provided at a position corresponding to the node 2 on the real path (S81 in FIG. 8). Integrating each move distance by the formula (1), errors occur in the distance from the start point to the node 2 due to move distance determination error. In order to correct the errors, the move distance from the start point to the node 2 obtained by the formula (1) is replaced with a link length from the start point which can be obtained from the path D.B. 6 to the node 2, by using the location information of the node 2 corresponding to the ID information thereof on the mapping D.B. 72, as represented in formula (3) (S82 in FIG. 8).

$$L(t) = (\text{Link Length from Start Point to Node 2}) + \sum_{n=m}^{n=t} l(n) \quad \text{Formula (3)}$$

Note that in denotes time required for reading ID information on the node 2.

The formula (3) cancels errors accumulated by integral calculation until the move distance reaches the node 2. Therefore, it is possible to execute a further integral calculation process to find a next move distance based on the node 2 as a base position in much smaller errors.

According to the second embodiment in FIG. 7 and FIG. 8, accumulated errors are cancelled on each node, resulting in reduction in accumulation of errors. A conventional position detecting using RFID cannot grasp a position of a moving object in an intermediate section of a link between two nodes. To the contrary, according to the second embodiment, it is possible to detect a position of a moving object even if the moving object locates in such an intermediate section of a link, and to detect a distance before a next node to which a pedestrian (the moving object) is proceeding and to display the information on the detected distance for the pedestrian.

According to the first embodiment in FIG. 2, the current position is set by handling a key on the terminal. However, according to the second embodiment in FIG. 7 and FIG. 8, it is possible to receive ID information from RFID of the node (S) of the start point 30 in FIG. 3 and automatically set the current position.

In stead of RFID, a position detecting device using radio beacons or WLAN (Wireless LAN) can also provide error correction to correct errors in the move distance. For example, when reading a radio beacon value in vicinity of a node on a real path, the position detecting device determines the pedestrian is near the node, and replace move distance obtained by the integral calculation with a value obtained from the path D.B. 6, so as to correct errors in the move distance. In case of using a GPS, position information provided by the GPS is used in a section where the GPS is available. If the GPS is not available, the method explained in FIG. 8 may be alternatively used, in which a position where the GPS data was last received is set as a base position, so as to provide path guidance for the pedestrian.

In addition, if the pedestrian is on a wrong path by accident, and the position detecting device reads a different RFID which does not exist on the planned path because, for example, the pedestrian did not turn right at the node 2 in FIG. 3, but went strait to a node 5, it is possible to set a node position corresponding to ID information of detected RFID on the wrong path as a start position, and re-execute the path planning process to maintain the same path guidance according to each embodiment.

The embodiments according to this invention have been explained as aforementioned. However, the embodiments of this invention are not limited to those explanations, and those skilled in the art ascertain the essential characteristics of this invention and can make the various modifications and variations to this invention to adapt it to various usages and conditions without departing from the spirit and scope of the claims.

What is claimed is:

1. A navigation system for guiding a moving object from a current position to a destination comprising:
    a setting device that sets the current position and the destination, using map information;
    a sensor that detects movement of the moving object;
    a computing device that calculates a move distance, without regard to a direction of movement, that the moving object has moved from the current position based on data outputted from the sensor, the computing device determining a position of the moving object by shifting the current position by the calculated move distance, along a designated path defined by designated path data between the current position and the destination, which designated path data have been determined by a path planning; and
    a display device for displaying path guidance information depending on the determined position of the moving object; wherein,
    said display device displays said designated path as nodes and links in a linear map arrangement, as path guidance information; and
    when said moving object approaches a particular intersection or corner, said display device further displays a two-dimensional partial map which indicates that particular intersection or corner by using map information, to prompt the moving object to change its orientation.

2. The navigation system according to claim 1, wherein:
    the computing device compares a distance between the current position and a predetermined position with the calculated move distance on the designated path data; and
    the display device displays path guidance information about the predetermined position based on results of the comparison obtained by the computing device.

3. The navigation system according to claim 2, wherein the predetermined position is a position at which there occurs a change of an orientation of the designated path along which the moving object moves.

4. The navigation system according to claim 2, wherein the predetermined position is a position at which path conditions change in the designated path data.

5. The navigation system according to claim 1 further comprising a position detecting device for detecting whether or not the moving object has reached a predetermined position on the designated path data, wherein the calculated move distance is corrected based on outputted data from the detecting device.

6. The navigation system according to claim 5, wherein the detecting device uses any one of RFID, radio beacons, WLAN or GPS.

7. A method for path guidance for guiding a moving object from a current position to a destination comprising steps of:
    setting the current position and the destination;
    calculating a move distance, without regard to a direction of movement, that the moving object has moved from the current position;
    determining a position of the moving object by shifting the current position by the calculated move distance along a designated path defined by designated path data between the current position and the destination, which designated path data have been determined by a path planning; and
    displaying path guidance information depending on the determined position of the moving object;
    wherein, said displaying step comprises,
    displaying said designated path as nodes and links in a linear map arrangement, as path guidance information; and
    when said moving object approaches a particular intersection or corner, displaying a two-dimensional partial map which indicates that particular intersection or corner, to prompt the moving object to change its orientation.

* * * * *